(12) United States Patent
Zhu (10) Patent No.: US 11,858,617 B2
(45) Date of Patent: Jan. 2, 2024

(54) PROPELLER-DRIVEN HELICOPTER OR AIRPLANE

(71) Applicant: Xiaoyi Zhu, Shenzhen (CN)

(72) Inventor: Xiaoyi Zhu, Shenzhen (CN)

( * ) Notice: Subject to any disclaimer, the term of this patent is extended or adjusted under 35 U.S.C. 154(b) by 0 days.

(21) Appl. No.: 17/843,700

(22) Filed: Jun. 17, 2022

(65) Prior Publication Data

US 2022/0324554 A1 Oct. 13, 2022

Related U.S. Application Data

(60) Division of application No. 16/569,443, filed on Sep. 12, 2019, now Pat. No. 11,396,364, which is a (Continued)

(30) Foreign Application Priority Data

| Apr. 26, 2017 | (CN) | ......................... 201710281619.8 |
| Apr. 25, 2018 | (CN) | ......................... 201810379833.1 |

(51) Int. Cl.
| *B64C 21/02* | (2006.01) |
| *B64C 3/14* | (2006.01) |
| *B64C 11/18* | (2006.01) |

(52) U.S. Cl.
CPC ............... *B64C 21/02* (2013.01); *B64C 3/14* (2013.01); *B64C 11/18* (2013.01); (Continued)

(58) Field of Classification Search
CPC ........... B64C 21/02; B64C 3/14; B64C 11/18; B64C 2230/08; B64C 2230/20; (Continued)

(56) References Cited

U.S. PATENT DOCUMENTS 3,586,266 A * 6/1971 Bucher ................. B64C 23/005
                                                244/45 R
6,004,095 A * 12/1999 Waitz .................... F04D 29/667
                                                415/115

(Continued)

FOREIGN PATENT DOCUMENTS

| CN | 1812911 A | 8/2006 |
| CN | 101468713 A | 7/2009 |

(Continued)

OTHER PUBLICATIONS

International Search Report dated Aug. 1, 2018, issued to International Application No. PCT/CN2018/084620.

(Continued)

*Primary Examiner* — Assres H Woldemaryam
(74) *Attorney, Agent, or Firm* — Stein IP, LLC (57) ABSTRACT

The invention discloses an aircraft generating a larger thrust and lift by fluid continuity. First open channels used to extend fluid paths are formed in front parts and/or middle parts of windward sides of wings of the aircraft and extend from sides, close to the fuselage, of the wings to sides, away from the fuselage, of the wings, and the first open channels are concave channels or convex channels, so that a pressure difference in a direction identical with a moving direction is generated from back to front due to different flow speeds of fluid flowing over the windward sides of the wings in a lengthwise direction and a widthwise direction to reduce fluid resistance, and a larger pressure difference and lift are generated due to different flow speeds on the windward sides and leeward sides of the wings.

16 Claims, 2 Drawing Sheets

Related U.S. Application Data continuation of application No. PCT/CN2018/084620, filed on Apr. 26, 2018.

(52) U.S. Cl.
CPC ...... *B64C 2230/08* (2013.01); *B64C 2230/20* (2013.01); *B64C 2230/28* (2013.01)

(58) Field of Classification Search
CPC .......... B64C 2230/28; B64C 2003/143; B64C 2003/148; B64C 3/141; B64C 27/467; B64C 21/025
See application file for complete search history.

(56) References Cited

U.S. PATENT DOCUMENTS

| | | | | |
|---|---|---|---|---|
| 8,448,892 | B2 * | 5/2013 | Zhu | B64C 39/00 244/23 C |
| 8,870,124 | B2 * | 10/2014 | Ireland | B64C 23/06 416/223 R |
| 9,132,909 | B1 * | 9/2015 | Khorrami | B64C 21/10 |
| 9,315,264 | B2 * | 4/2016 | Zhu | B64C 21/025 |
| 2006/0049302 | A1 * | 3/2006 | Kennedy | B64C 27/615 244/17.11 |
| 2009/0266937 | A1 * | 10/2009 | Frankenberger | F15D 1/12 244/209 |
| 2010/0116943 | A1 * | 5/2010 | Meister | B64D 15/04 244/208 |
| 2011/0001000 | A1 * | 1/2011 | Zhu | B64C 39/00 244/17.11 |
| 2011/0260008 | A1 * | 10/2011 | Smith | B64C 23/069 416/232 |
| 2013/0306803 | A1 * | 11/2013 | Zhu | B64C 39/026 244/23 C |
| 2016/0368566 | A1 * | 12/2016 | Zhu | B62D 35/00 |
| 2017/0029100 | A1 * | 2/2017 | Zhu | B64C 27/473 |
| 2017/0197697 | A1 * | 7/2017 | Zhu | B64C 3/00 |
| 2017/0218986 | A1 * | 8/2017 | Laforest | F01D 5/145 |
| 2017/0320558 | A1 * | 11/2017 | Zhu | B64C 3/141 |
| 2018/0305019 | A1 * | 10/2018 | Hubschwerlen | B64C 21/02 |

FOREIGN PATENT DOCUMENTS

| | | |
|---|---|---|
| CN | 101823554 A | 9/2010 |
| CN | 101941522 A | 1/2011 |
| CN | 102556345 A | 7/2012 |
| CN | 104210644 A | 12/2014 |
| CN | 104386236 A | 3/2015 |
| CN | 104386237 A | 3/2015 |
| CN | 104608919 A | 5/2015 |
| CN | 104647168 A | 5/2015 |
| CN | 104890858 A | 9/2015 |
| CN | 105947163 A | 9/2016 |
| CN | 106218865 A | 12/2016 |
| CN | 106364666 A | 2/2017 |
| CN | 106467164 A | 3/2017 |
| CN | 106672088 A | 5/2017 |
| CN | 106672089 A | 5/2017 |
| CN | 107044442 A | 8/2017 |
| CN | 107074349 A | 8/2017 |
| CN | 107089327 A | 8/2017 |
| EP | 2 390 178 A2 | 11/2011 |
| WO | WO 2011/015891 A1 | 2/2011 |

OTHER PUBLICATIONS

First Office Action dated Nov. 29, 2018, issued to counterpart Chinese Application No. 201710281619.8.
Second Office Action dated Jul. 18, 2018, issued to counterpart Chinese Application No. 201710281619.8.
First Office Action in counterpart Chinese application 201810379833.1 dated Dec. 12, 2020.

* cited by examiner

PROPELLER-DRIVEN HELICOPTER OR AIRPLANE

CROSS-REFERENCE TO RELATED APPLICATIONS

This application is a divisional of U.S. application Ser. No. 16/569,443, filed Sep. 12, 2019 in the U.S. Patent and Trademark Office, which is a continuation of International Application No. PCT/CN2018/084620 filed Apr. 25, 2018, which further claims priority to Chinese Application No. 201710281619.8, filed Apr. 26, 2017 and Chinese Application No. 201810379833.1, filed Apr. 25, 2018, the disclosures of which are incorporated in their entireties by reference.

TECHNICAL FIELD

The invention relates to the technical field of aircrafts, in particular to an aircraft generating a larger thrust and lift by fluid continuity.

DESCRIPTION OF RELATED ART

So far, aircrafts have been around for over a hundred years, wherein fixed-wing aircrafts have the technical problem of a poor lift caused by a small difference between the arc windward sides and planar lower surfaces of the wings, and rotary-wing helicopters also have the technical problem of a poor lift generated by the propeller.

Fluid flows over the upper and lower surfaces of the wings along different paths to reach the tail at the same time to generate a lift, and what is the "power" that forcibly accelerates the fluid on the upper surfaces of the wings to reach the tail at the same time as the fluid on the lower surfaces of the wings.

Forward fluid resistance, lateral fluid resistance, and fluid resistance in a rear negative-pressure zone of moving devices are handled separately instead of being handled as a whole. Up to now, the fluid resistance is the maximum energy consumption of the moving devices, which causes an extremely low actual energy utilization rate.

The wing structure of the aircrafts is developed in light of the wings of birds, and therefore, the wings of birds have a direct and closed relation with the wing structure of the aircrafts. Particularly, the wings of eagles have become almost perfect after millions of years of evolution, and of all birds, eagles are generally recognized as the ones having the maximum flying speed and the minimum energy consumption.

In U.S. Pat. No. 8,448,892B3 granted rights and titled "Flying Saucer", U.S. Pat. No. 9,745,047B2 granted rights and titled "Large Airplane", and U.S. Pat. No. 9,315,264B2 granted rights and titled "Helicopter Power Device", the inventor has disclosed a larger lift generated from the interior of the fixed-wing aircrafts and the rotary-wing aircrafts in such a manner that the moving devices are sealed in a large negative-pressure zone to create larger fluid resistance, and fluid vents are prevented from being closed to drastically reduce the fluid resistance.

In view of this, the invention has the following new understanding on the lift generated by traditional wings:

The fluid continuity refers to the continuity maintained in a sealed large negative-pressure zone by means of a negative pressure, so that fluid on the upper surfaces of the wings is accelerated to reach the tail at the same time as fluid on the lower surfaces of the wings along a different path to generate a lift.

Therefore, fluid continuity refers to fluid continuity in the large negative-pressure zone and is realized under the drive of power (namely the negative pressure), and the negative pressure maintains the fluid continuity in the large negative-pressure zone to enable the wings to generate a lift.

BRIEF SUMMARY OF THE INVENTION

The technical issue to be settled by the invention and the beneficial effect to be fulfilled by the invention is to generate a larger lift and thrust by fluid continuity.

I. To Obtain the Source of a Larger Lift by Fluid Continuity

1. Source of a primary lift: wings are sealed in a large negative-pressure zone, and a pressure difference between the large negative-pressure zone and an external positive-pressure zone is a lift source.

Fluid continuity refers to fluid continuity in the large negative-pressure zone, the wings are sealed in the large negative-pressure zone with a high flow speed, the fluid outside the large negative-pressure zone gradually slows down towards the outside until the flow speed and the pressure of the fluid reach a low flow speed and a high pressure generated by the external positive-pressure zone with an environmental flow speed within a wider range. At this moment, fluid rushes into the large negative-pressure zone with a high flow speed and a low pressure around the wings from the positive-pressure zone, and a pressure difference is generated due to the different flow speeds of the positive-pressure zone and the negative-pressure zone; with the increase of the flight speed of the aircraft, the flow speed in the large negative-pressure zone increases, the pressure difference generated between the positive-pressure zone and the negative-pressure zone increases, the fluid resistance generated increases, and a larger lift is generated; otherwise, a small lift is generated. Therefore, when the aircraft flies at a high speed, the lift generated by the wings has little relation with a pressure difference between the upper and lower surfaces of the wings, while it has a closed relation with the speed of the aircraft and a direct relation with the pressure difference between the positive-pressure zone and the negative-pressure zone. The invention discovers the source of a larger lift for high-speed aircrafts to greatly increase the flight speed of the aircrafts. Thus, the real reason, which still remains disputable at present, for lift generation of aircrafts such as supercritical airfoil aircrafts is clearly explained.

2. Source of a secondary lift: a pressure difference generated by fluid flowing over the upper and lower surfaces of the wings in the lengthwise and widthwise directions along different paths is another lift source.

It can be known by observation that most fluid on the windward sides of the wings of eagles is guided in the lengthwise direction by means of the feather arrangement structure or self adjustment, while fluid on the leeward sides of the wings is guided in the widthwise direction by means of the feather arrangement structure, so that a larger lift is generated. The energy utilization rate and flexibility of the wings with such characteristics of the eagles are much better than those of the wings of any existing aircrafts.

However, the large negative-pressure zone around swept back wings generates a backward pressure (towards the wingtips) to maintain the fluid continuity, and the pressure in this direction presses the wings on the left and right sides of the fuselage outwards, so that fluid flows over the upper and lower surfaces of the wings in the lengthwise direction along different paths to reach the wingtips at the tail at the same time to generate a lift.

However, it will be realized by further observation that this is not true. A backward pressure generated by a large negative-pressure zone around a fuselage to maintain the fluid continuity will be affected by the outward pressure generated by the large negative-pressure zone around the wings in front, and the lift is drastically reduced by the cross influence of the two large negative-pressure zones around the fuselage and the wings in different directions. The fluid continuity includes both the fluid continuity in the large negative-pressure zone around the fuselage and the fluid continuity of the large negative-pressure zone around the wings, and the fluid flows around the fuselage and the wings along different paths to reach the tails at the same time. In this process, under the effect of the pressure generated by the large negative-pressure zone of the fuselage, most fluid passing through the wings near the fuselage flows backwards along the large negative-pressure zone of the fuselage, the fluid, which originally flows over the upper and lower surfaces of the wings in the lengthwise direction, is made to flow in the widthwise direction of the wings, and thus, the lift is reduced.

An effective solution to reducing the influence of the large negative-pressure zone of the fuselage on the large negative-pressure zone of swept back wings is to form first open channels in the lengthwise direction of windward sides of the wings to guide the fluid to flow in the lengthwise direction defined by the open channels. The key point lies in that the pressure direction in the large negative-pressure direction of the wings should be identical with the direction defined by the open channels in the windward sides of the wings, so that part, most, or even more fluid can more easily counteract the large negative pressure from the fuselage along a path defined by the open channels under the effect of a negative pressure generated by the large negative-pressure zone of the wings so as to flow over the windward sides of the wings in the lengthwise direction, and then a larger lift is generated due to different flow speeds of the fluid flowing over the windward sides of the wings in the lengthwise direction and the fluid flowing over the leeward sides of the wings in the widthwise direction.

Therefore, the source of a secondary lift is obtained in light of the feather arrangement structure of the wings of eagles.

3. Source of a tertiary lift: the upper and lower surfaces of the wings are communicated via a plurality of air vents, so that a high pressure on the lower surfaces of the wings is transferred towards a lower pressure on the upper surfaces of the wing in a direction opposite to an external pressure on the upper surfaces, so as to counteract the external pressure, then the fluid resistance is reduced, and a lift is generated.

In the invention, based on the objective factor that the flow speed on the lower surfaces of the wings is lower than that on the upper surfaces of the wings, the upper surfaces and lower surfaces of the wings are communicated via the air vents to directly generate a lift and to reduce the fluid resistance synchronously.

Particularly, when the fluid gradually flows over the upper and lower surfaces of the wings and does not reach the tail, the high pressure generated on the lower surfaces is uniformly and gradually transferred towards the low pressure on the upper surfaces via the air vents to counteract the external fluid pressure in the opposite direction on the upper surfaces, and with the increase of the difference between the flow speeds of the upper and lower surfaces, more fluid resistance will be counteracted, and a larger lift will be directly generated. In this invention, the fluid resistance is reduced, and then a lift (namely the primary lift) is generated; afterwards, the fluid flows over the upper and lower surfaces of the wings along different paths to reach the tail at the same time to generate a secondary lift; and the primary lift and secondary lift constitute the tertiary lift.

II. To Obtain the Source of a Large Thrust by Fluid Continuity

It can be known by observation that multiple layers of feathers are arrayed externally on the front half of the windward sides of the wings of eagles to guide most of the fluid on the front half to flow in the lengthwise direction, while the number of layers of feathers on the rear half is greatly reduced and only one layer of feathers is left at the tail, so that fluid on the rear half is guided to flow in the widthwise direction; and a pressure difference is generated due to different flow speeds of the front and rear parts of the windward sides in the lengthwise and widthwise directions, and the direction of the pressure difference is from back to front, which is consistent with the moving direction, so that a thrust is generated.

Existing moving devices consume about 90% of energy to overcome the fluid resistance, which means that the actual energy utilization rate is only about 10%; and such a low energy utilization rate seriously hinders the development of energy and the moving devices in the future.

The source of a first thrust of the invention is obtained by fluid continuity as follows:

If the direction of a pressure difference generated due to different flow speeds of front and rear parts of the moving directions is identical with the moving direction, the source of a thrust can obtained; otherwise, the fluid resistance will be increased.

The forward fluid resistance and lateral fluid resistance generated by traditional moving devices are guided into the rear negative-pressure zone in the front-back direction to form a sealed large negative-pressure zone, and in this process, different fluid pressures are all converted into a larger backward fluid pressure which is exactly opposite to the moving direction, which in turn results in fluid resistance.

On the contrary, in the invention, the pressure generated by the first thrust is identical with the moving direction of the moving device and is opposite to the pressure generated by the large negative-pressure zone. According to the natural law, the fluid pressures in different directions are counteracted when encountered, and thus, the fluid resistance is reduced, and the source of the first thrust is obtained.

Reference Signs:

1, fuselage; 11, front part of fuselage; 111, second open channel; 2, wing; 21, windward side of wing; 22, leeward side of wing; 211, front part; 212, middle part; 213, rear part; 214, first open channel; 2141, concave channel; 2142, convex channel; 215, third open channel; 216, spoiler; 4, control mechanism; 5, negative-pressure pocket; 51, fuselage negative-pressure zone; 6, positive-pressure zone; 7, propeller; 71, windward side of blade; 72, fourth open channel; 73, pressure port; 74, front half; 75, rear half; 23, wings negative-pressure zone.

DETAILED DESCRIPTION OF THE INVENTION

The technical solutions, objectives, and effects of the invention are expounded below with reference to the embodiments and accompanying drawings. The key concept of the invention at least includes:

A larger lift is generated due to different flow speeds of fluid flowing over windward sides of wings in a lengthwise direction and flowing over leeward sides of the wings in a widthwise direction, and a thrust is obtained from a pressure which is in a direction identical with the moving direction and is generated due to different flow speeds of front and rear parts of a fuselage and the wings.

Figure 1:
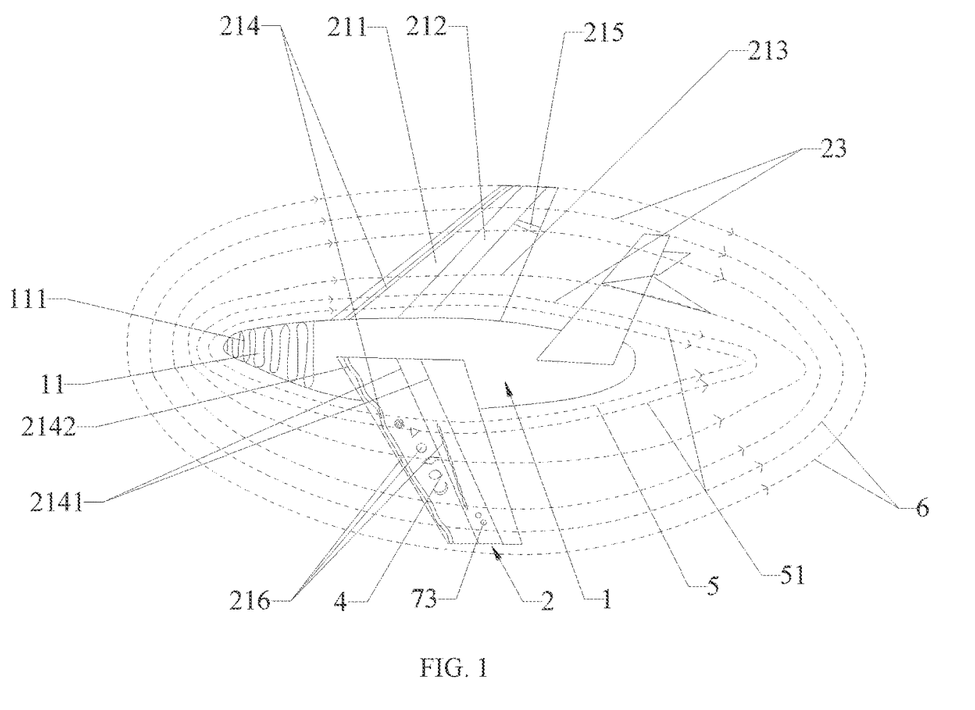
FIG. 1 is an overall structural diagram of an aircraft of the invention.
Figure 2:
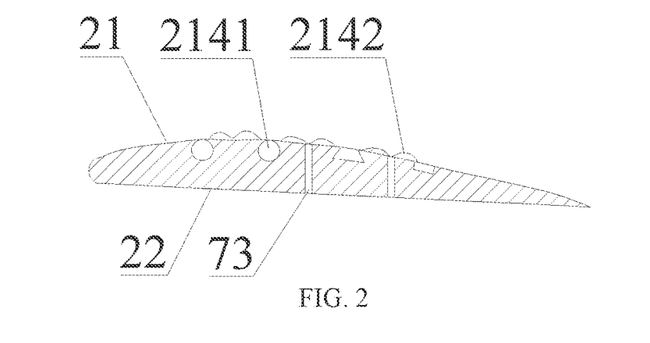
FIG. 2 is a sectional view of a wing of the aircraft shown in FIG. 1.

Referring to FIG. 1-FIG. 2, one technical solution adopted by the invention is as follows: an aircraft comprises a fuselage 1 and wings 2, wherein first open channels 214 used to extend fluid paths are formed in windward sides 21 of the wings 2 and extend from roots of sides, close to the fuselage 1, of the wings 2 to tails of sides, away from the fuselage 1, of the wings 2; and the first open channels 214 are concave channels 2141 or convex channels 2142, so that a larger lift is generated due to different flow speeds of fluid flowing over the windward sides 21 of the wings in a lengthwise direction and flowing over leeward sides 22 of the wings in a widthwise direction.

From the above description, the invention has the following beneficial effects: due to the fact that the length of the wings is generally several times greater than the width of the wings, the first open channels are formed to guide fluid to flow over the windward sides of the wings in the lengthwise direction and to flow over leeward sides of the wings in the widthwise direction, and a larger pressure difference and lift are generated due to different flow speeds.

Figure 3:
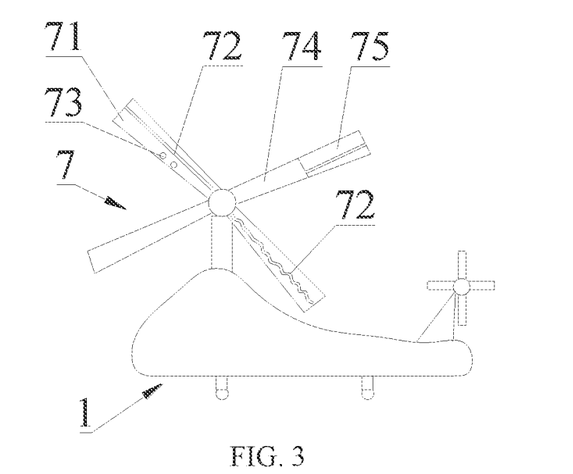
FIG. 3 is another overall structural diagram of the aircraft of the invention.

Referring to FIG. 2-FIG. 3, another technical solution adopted by the invention is as follows: an aircraft is a propeller-driven helicopter or airplane and comprises a fuselage 1 and a propeller 7, wherein the propeller 7 comprises a plurality of blades, wherein at least one fourth open channel 72 is formed in a windward side 71 of each blade in a whole lengthwise direction from the root to the tail, and the fourth open channels 72 are concave channels 2141 and convex channels 2142, or the fourth open channels 72 are concave channels 2141 or convex channels 2142, so that a larger pressure difference and lift are generated due to different flow speeds of fluid flowing over the windward sides 71 of the blades in the lengthwise direction and flowing over leeward sides of the blades in a widthwise direction.

From the above description, as for the propeller-driven helicopter or airplane, the fluid flows through the fourth open channels formed in the windward sides of the blades in the lengthwise direction to lead to a high flow speed and a low pressure, while the fluid flows over lower surfaces of the blades in the widthwise direction to lead to a low flow speed and a high pressure, and a larger pressure difference generated due to different fluid paths and different flow speeds of the fluid is the source of a larger lift and thrust of the helicopter or airplane driven by rotary wings. On this basis, the aircraft generating a larger thrust and lift is developed.

Furthermore, the aircraft further comprises spoilers. The concave channels are concaved downwards relative to windward sides of shells of the blades, and openings of the concave channels are flush with the shells of the blades and become larger gradually towards bottom surfaces to be big-end-down to allow fluid to flow through smoothly: the convex channels slightly protrude out of the surfaces of the shells; at least one of the concave channels and the convex channels are in an arc shape: the spoilers are arranged in the concave channels or are uniformly arrayed to form the convex channels; and the spoilers are in a shape selected from one or more of a triangular shape, a circular shape, a rhombic shape, a trapezoid shape, an oval shape, a spiral shape, and an arc shape.

Referring to FIG. 2-FIG. 3, another technical solution adopted by the invention is as follows: an aircraft comprises a fuselage 1, and wings 2, or a propeller 7 fixedly connected with the fuselage, wherein the propeller 7 comprises a plurality of blades, first open channels 214 used to extend fluid paths are formed in windward sides of the wings 2 or in a windward side of the propeller 7 and extend form the root of a side close to the fuselage 1 to the tail of a side away from the fuselage, and the first open channels 214 are concave channels 2141 or convex channels 2142; windward sides and leeward sides of the wings 2 or blades are communicated via at least two pressure ports 73, so that a high pressure generated by a low flow speed on the leeward sides is transferred towards a low pressure generated by a high flow speed on the windward sides via the pressure ports 73, the pressure at the pressure ports 73 is opposite to an external fluid pressure on the windward sides in direction and counteracts the external fluid pressure, and a lift is generated by the wings 2 or the propeller 7 after fluid resistance is reduced.

From the above description, different from common knowledge, a lift is gradually generated in the invention when the fluid flows over upper and lower surfaces of the wings (not reaching the tail). The high pressure on the lower surfaces of the wings is uniformly transferred towards the low pressure on the upper surfaces of the wings via the small pressure ports in a direction opposite to the external fluid pressure so as to counteract the external fluid pressure, so that the fluid resistance is reduced, and a lift is generated. Therefore, a larger lift (namely the primary lift) is generated after fluid resistance is reduced.

Afterwards, the fluid flows over the upper and lower surfaces of the wings along different paths to reach the tail at the same time to generate a secondary lift.

Embodiment 1: as shown in FIG. 1-FIG. 2, an aircraft comprises wings 2, wherein a plurality of first open channels 214 are uniformly in front parts 211 and/or middle parts 212 of windward sides 21 of the wings in the whole lengthwise direction (longitudinal direction) from roots to tails of the wings; and the first open channels 214 are concave channels 2141 and/or convex channels 2142, the concave channels 2141 are concaved downwards, and the convex channels 2142 slightly protrude upwards. Preferably, openings of the concave channels become larger gradually towards bottom surfaces to be big-end-down to allow fluid to flow through more smoothly; and the openings of the concave channels 2141 are linear and are flush with the upper surfaces of the wings, so that the fluid can smoothly enter the large spaces in the concave channels 2141 via the openings and then smoothly flow through the concave channels 2141.

Furthermore, as illustrated by FIG. 1 showing the lower wing, the concave channels 2141 and/or the convex channels 2142 are arc channels formed in the lengthwise direction of the wings 2 to extend the fluid paths in the lengthwise direction to a greater extent.

Furthermore, spoilers are arranged in the concave channels to further extend the fluid paths; or, multiple spoilers are uniformly arrayed to form the convex channels to further extend the fluid paths; and the spoilers are in a shape selected from one or more of a triangular shape, a circular shape, a rhombic shape, a trapezoid shape, an oval shape, a spiral shape, and an arc shape.

Furthermore, the length of the wings is generally multiple times greater than the width of the wings on the average, and the radian of the multiple first open channels 214 formed in the windward sides 21 of the wings become smaller gradually from front to back, which means that the fluid paths on the front parts are longer than the fluid paths on the rear parts, so that the flow speed of fluid flowing through the front parts and/or the middle parts 212 of the windward sides 21 of the wings in the lengthwise direction is high, while the flow speed of fluid flowing through rear parts 213 (not provided with open channels) in the widthwise direction is low, a pressure difference in a direction identical with the moving direction is generated on the windward sides from back to front due to the different flow speeds, and the source of a thrust is obtained.

Furthermore, the pressure difference generated between the front parts and the rear parts of the windward sides of the wings from front to back reduces the resistance, the downward pressure borne by the windward sides is reduced, and thus, a larger pressure difference and lift are generated between the windward sides and the leeward side 22.

The first open channels used for extending the fluid paths are formed along the windward sides of the whole wings to generate a greater pressure difference between the windward sides and the leeward sides 22, which in turn creates a larger lift.

Furthermore, the length of the wings is generally multiple times greater than the width of the wings on the average, the first open channels 214 are uniformly formed in the windward sides of the wings in the whole lengthwise direction (longitudinal direction) from the roots to the tails of the wings, and the pressure direction in the large negative-pressure zone of the wings is identical with the direction defined by the first open channels in the windward sides of the wings, so that a greater pressure difference and a secondary lift are generated due to different flow speeds of fluid flowing over the windward sides in the lengthwise direction and flowing over the leeward sides in the widthwise direction.

Furthermore, second open channels 111 are formed around a front part 11 of the fuselage (horizontally), and the second open channels are concave channels 2141 and/or convex channels 2142 and used to extend a fluid path, so that no matter how long the fuselage is, a pressure difference in a direction identical with the moving direction is generated from back to front due to different flow speeds of front and rear ends of the fuselage 1 in the lengthwise direction by fluid continuity and reaches the front part 11 instantly, and the pressure difference is opposite to the pressure on the windward side of the fuselage in direction and counteracts the pressure on the windward side: and in terms of a corresponding energy-saving relation, if the flow speed difference between the front and rear ends increases, the pressure difference increases, more external pressure on the windward side is counteracted, and a larger first thrust is obtained. The key solution to reducing the fluid resistance in this invention lies in that: if the direction of a pressure difference generated due to different flow speeds of the front and rear parts of the moving device is identical with the moving direction, the source of a thrust is obtained; otherwise, fluid resistance will be increased. A larger first thrust is obtained by the fluid continuity. According to the natural law, fluid pressures in opposite directions will be mutually counteracted when encountered, the fluid resistance will be reduced accordingly, and thus, the first thrust is obtained.

Furthermore, the windward sides 21 of the wings are communicated with the leeward sides 22 of the wings via a plurality of uniformly-distributed pressure ports 73 (small holes) with small ventilation areas, so that a high pressure generated by a low flow speed on the leeward sides 22 of the wings is uniformly transferred towards a low pressure generated by a high flow speed on the windward sides 21 of the wings, and the pressure at the pressure ports 73 is opposite to an external fluid pressure on the windward sides 21 of the wings in direction and counteracts the external fluid pressure, so that the fluid resistance is reduced. Therefore, in the invention, the fluid resistance is reduced first, and then a lift (namely the primary lift) is directly generated. Afterwards, the fluid flows over the upper and lower surfaces of the wings along different paths to reach the tail at the same time, the first open channels 214 are formed in the windward sides of the wings in the whole lengthwise direction from the roots to the tails, and thus, a greater pressure difference and a secondary lift are generated due to different flow speeds of fluid flowing over the windward sides of the wings in the lengthwise direction and flowing over the leeward sides in the widthwise direction.

The primary lift and the secondary lift constitute the tertiary lift of the invention.

As we all know: for any moving devices such as cars, trains, ships, airplanes, bullets, missiles, etc., the fluid flows from the front end in the length direction (not the width direction) to the rear end to maintain the continuity of the fluid. The wings of the aircraft on the left and right sides of the fuselage extend backwards at a certain angle, so that the pressure directions of the wings negative-pressure zone and the fuselage negative-pressure zone are different, and cross-effects are generated to reduce the lift of the wings.

Figure 4:
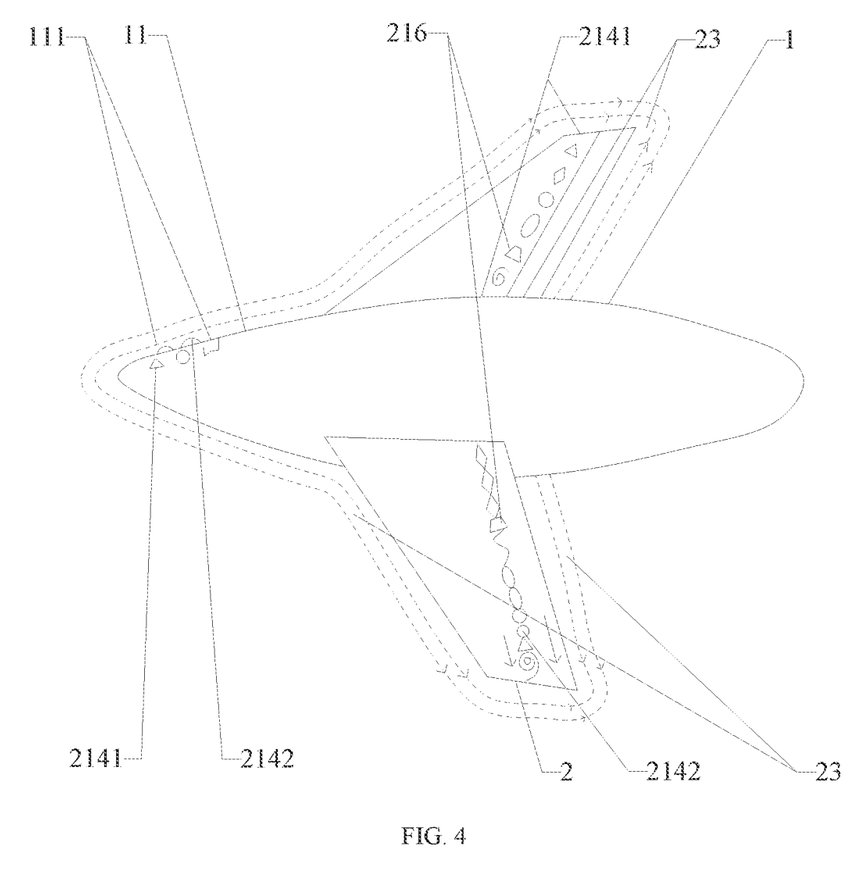
FIG. 4 is another overall structural diagram of the aircraft of the invention.

Referring to FIG. 4 (without considering the negative-pressure zone at the rear of the fuselage), the fluid surrounds the length direction of the wings flows from the front end (left and right sides of the fuselage) through different paths of the upper and lower surfaces of the wings while reaching the wingtips at the tail at the same time, forming a sealed wings negative-pressure zone 23 which creates fluid continuity. Without considering the negative-pressure zone at the rear of the fuselage, the fluid originally flows through the length direction of the wings to generate greater lift, however, this is not the case.

Referring to FIG. 1 (considering the negative-pressure zone at the rear of the fuselage), because the volume of the fuselage 1 is much larger than that of the wings 2, the larger the fuselage volume, the larger the negative-pressure zone and the greater the negative pressure. The fuselage negative-pressure zone 51 generates a large fluid pressure so that most of the fluid flows through the width direction of the wings. Therefore, the directions of the pressures generated by the fuselage negative-pressure zone and the wings negative-pressure zone are different, so that the small wings negative-pressure zone 23 cannot get rid of the fluid pressure of the large fuselage negative-pressure zone 51 and must flow in the same direction. Most of the fluid above the upper and lower surfaces of the wings in FIG. 4 changes from flowing along the original length direction to flowing along the width direction in FIG. 1; only to maintain the "fuselage" fluid continuity instead of maintaining the wings fluid continuity, at this time the wings negative-pressure zone is negligible: and the "fuselage" fluid continuity significantly reduces the lift of the wings.

In response to the above problems: although the fuselage negative-pressure zone produces a large fluid pressure to drive the wings negative-pressure area to move in the same direction, the outward pressure around the fuselage negative-pressure zone will gradually decrease. Therefore, in order to reduce the cross-effect of the fuselage negative pressure zone on the wings negative-pressure zone, first open channels are provided in the length direction of the windward surface of the wings, so that part or even more fluid can flow through the length direction defined by the channels, the direction of the pressure generated by the first open channels is consistent with the direction of the pressure generated by the wings negative pressure zone 23, and the concave channels have a big-end-down shape to allow fluid to flow therethrough smoothly. Under the action of the pressure generated by the wings negative-pressure zone 23, part of fluid or even more fluid above the windward surfaces has an opportunity to flow through the length direction in the first open channels, while more fluid above the leeward surfaces flows through the width direction, the flow speeds of the two are different, resulting in generating greater pressure difference and lift.

Embodiment 2: this embodiment differs from Embodiment 1 in the following aspects: shells of the windward sides 21 of the wings are skin, and a control mechanism 4 is arranged to change the shape of the skin. For instance, the concave channels 2141 and/or convex channels 2142 or spoilers 216 are formed on the skin by means of compressed air to extend the fluid paths (this is a common practice in the art).

According to the requirements, the skin of the wings in the invention is just like that of common aircrafts when the aircraft flies normally; and when the aircraft flies stably under an energy-saving condition, the control mechanism 4 changes the shape of the skin of front parts 211 of the wings to extend the fluid paths, so that a pressure difference from back to front is generated between the front parts 211 and rear parts 213 of the wings, and accordingly, a first thrust of the invention is obtained.

Source of a primary lift generated by the wings: when the aircraft flies at a high speed, a positive-pressure zone 6 around the wings transfers a pressure difference towards a large negative-pressure zone 51, the wings are pushed by the pressure difference to move upwards, and the difference between the positive pressure and the negative pressure is the source of the primary lift. This also indicates that different lifts will be generated by the pressure difference between the upper and lower surfaces of the wings when the aircraft flies at a low speed and a high speed. When the aircraft flies at a high altitude with thin air, the difference still exists between the positive pressure and the negative pressure without being affected by the reduction of fluid resistance, so that the aircraft can fly faster and faster. With the increase of the difference between the positive pressure and the negative pressure, the lift generated will become larger.

Fluid resistance generated by the fuselage: the positive-pressure zone 6 will inevitably transfer a pressure to the negative-pressure zone 51 according to the natural law. Similarly, skin is arranged on the front part 11 of the fuselage, the shape of the skin is changed by a control mechanism 4 to form the second open channels 111, a pressure difference in a direction identical with the moving direction is generated due to different flow speeds of the front part and the rear part of the fuselage, the pressure in the large negative-pressure zone 51 can be greatly reduced, the fluid resistance is reduced, and accordingly, a first thrust is obtained.

The primary lift is in direct proportion to the fluid resistance and is in reverse proportion to energy saved, which means that more energy will be consumed to generate a larger lift. However, in this embodiment, an ingenious design is adopted to enable the fuselage to reduce the fluid resistance and to enable the wings to generate a larger primary lift.

Embodiment 3: this embodiment differs from Embodiment 2 in that the technical solution of this embodiment is opposed to that of Embodiment 2.

Particularly, the shape of the skin on the rear parts 213 of the windward sides of the wings is changed through the control mechanism 4 to generate the concave channels 2141 and/or convex channels 2142 or spoilers 216 to extend fluid paths to a greater extent, so that a pressure difference in a direction identical with the moving direction is generated on the windward sides of the wings from front to back, a negative pressure generated in the sealed large negative-pressure zone 51 is increased, the difference between the positive pressure and the negative pressure is increased, and accordingly, a larger lift is generated.

When the aircraft needs to generate a much larger lift instantly as actually needed, the flow speed on the rear parts of the wings is controlled to be much higher than that of the front parts of the wings to greatly increase the difference between the positive pressure and the negative pressure, so that the primary lift generated by the wings is greatly improved instantly, the flight condition of the aircraft can be changed instantly, and this is very important for the aircraft.

Embodiment 4: this embodiment differs from the above embodiment in the following aspects: third open channels 215 are formed in the rear parts 213 of the windward sides 21 of the wings in the widthwise direction (horizontal direction) and extend in the widthwise direction of the rear parts 213 of the wings, and the third open channels 215 are concave channels 2141 or convex channels 2142 or spoilers, so that it is further defined that fluid flows through the front parts 211 and/or the middle parts 212 of the windward sides 21 of the wings in the lengthwise direction and flows through the rear parts 213 in the widthwise direction to generate a pressure difference from back to front, and accordingly, a first thrust is obtained.

Furthermore, a plurality of concave channels and/or convex channels or spoilers (not shown, common practice) are arranged on the leeward sides 22 of the wings in the widthwise direction (horizontal direction), so that it is further defined that the fluid flows over the windward sides 21 of the wings in the lengthwise direction and flows over the leeward sides 22 of the wings in the widthwise direction to generate a larger pressure difference and a secondary lift.

Embodiment 5: this embodiment differs from Embodiment 4 in the following aspects: in this embodiment, the windward sides 21 of the wings are communicated with the leeward sides 22 of the wings via a plurality of pressure ports 73, a high pressure on the leeward sides is transferred towards a low pressure on the windward sides via the pressure ports 73 when fluid flows over the upper and lower surfaces of the wings (not reaching the tail), and the pressure at the pressure ports 73 is opposite to an external fluid pressure on the windward sides in direction and counteracts the external fluid pressure, so that a primary lift is generated.

In the invention, the fluid resistance is reduced first, and then a lift (namely the primary lift) is generated directly.

Afterwards, the fluid flows over the upper and lower surfaces of the wings along different paths to reach the tail at the same time to generate a secondary lift. In this way, a larger tertiary lift of the invention is obtained. Therefore, the lift is directly generated while the fluid resistance is reduced in this embodiment.

According to common knowledge, a lift is generated after fluid flows over the upper and lower surfaces of the wings along different paths to reach the tail at the same time, which means that the lift can be generated under the condition where the fluid flows over the upper and lower surfaces of the wings first and then reaches the tail at the same time, so that the lift is generated indirectly instead of being generated directly, and huge fluid resistance is caused while the lift is generated.

Furthermore, the pressure ports 73 are vents used for transferring the pressure and do not have a large area.

Similarly, the pressure ports 73 can also be applied to the wings in other embodiments mentioned above.

Embodiment 6: as shown in FIG. 4, a propeller-driven helicopter comprises a fuselage 1 and a propeller 7, wherein the propeller 7 comprises a plurality of blades, fourth open channels are formed in windward sides 71 of the blades, and particularly, at least one fourth channel 72 is formed in the windward side 71 of each blade in the lengthwise direction of the blade from the root to the tail; the four open channels are concave channels 2141 and/or convex channels 2142; and when the propeller rotates at a high speed, fluid can easily flow through the open channels under a centrifugal force generated during high-speed rotation of the propeller. Because the length of the blades is generally about 20 times that of the width of the blades, a pressure difference of about 20 times and a lift of about 20 times are generated.

When the helicopter flies, a powerful centrifugal force generated during high-speed rotation of the propeller 7 instantly ejects the fluid outwards, and the direction of the concave channels is consistent with the flow direction of the fluid having a high traction from the centrifugal force, so that the fluid can flow through the concave channels more easily and is finally discharged from blade tips, the fluid paths are extended by the fluid continuity resulting from the centrifugal force, the fluid flows over the windward sides in the lengthwise direction more rapidly to lead to a high flow speed and flows over the leeward sides in the widthwise direction to lead to a low flow speed, and a larger pressure difference and lift are generated due to the different flow speeds.

Furthermore, the convex channels are slightly higher than the surfaces of shells on the windward sides to avoid fluid resistance during high-speed rotation of the propeller 7. Preferably, the convex channels and the concave channels are arc channels, so that the fluid paths can be extended to a greater extent. Preferably, concave channels and/or convex channels are formed in rear halves 75 of the windward sides of the blades 71 to form a high-speed fluid layer, that is to say, the fourth open channels 72 are located at ends, away from the fuselage 1, of the rear halves 75 of the blades, so that a pressure difference is generated between a high flow speed of the rear halves 75 and a low flow speed of front halves 74 of the blades in a direction identical with the outward rotation direction of the propeller 7, and accordingly, a larger thrust and lift are generated.

Furthermore, the windward sides 71 of the blades are partially or entirely communicated with the leeward sides of the blades via a plurality of pressure ports 73 (tiny holes) with small ventilation areas, so that a high pressure generated by a low flow speed on the leeward sides of the blades is uniformly transferred towards a low pressure generated by a high flow speed on the windward sides 71 of the blades: and the pressure at the pressure ports 73 is opposite to an external fluid pressure on the windward sides 71 of the blades in direction and counteracts the external fluid pressure, so that the fluid resistance is reduced, and a tertiary lift is generated.

In another specific embodiment, a propeller-driven airplane (not shown, common practice in the art) comprises a propeller 7 arranged on the front of a fuselage 1, wherein a plurality of concave channels and/or convex channels are formed in the windward sides 71 or leeward sides of blades, so that a larger pressure difference and thrust are generated due to different flow speeds of fluid flowing over the windward sides of the blades in the lengthwise direction and flowing over the leeward sides of the blades in the widthwise direction.

In conclusion, a first thrust is obtained by means of fluid continuity in light of the feather arrangement structure of eagles, the primary lift, the secondary lift and the tertiary lift are obtained by the fluid continuity, and thus, a high-speed aircraft generating a larger lift and thrust is developed.

The above embodiments are only illustrative ones of the invention, and are not intended to limit the patent scope of the invention. All equivalent transformations made on the basis of the contents of the specifications and accompanying drawings, or direct or indirect applications to relevant technical fields should also fall within the patent protection scope of the invention.

The invention claimed is:

1. An aircraft, comprising a fuselage, wings and a propeller including a plurality of blades, wherein
   a first plurality of open channels used to extend fluid paths are formed in windward sides of the blades in a lengthwise direction;
   the first plurality of open channels extend from sides of roots of the blades to tails away from the sides of the roots, and the first plurality of open channels are concave channels and convex channel, or the first plurality of open channels are concave channels or convex channels; a pressure direction of a centrifugal force generated during rotation of the blades is consistent with a flowing direction of fluid in the first plurality of open channels, so that a larger pressure difference and lift are generated due to different flow speeds of a high-speed fluid flowing over the windward sides of the blades in the lengthwise direction and a low-speed fluid flowing over leeward sides of the blades in a widthwise direction;
   the windward sides and leeward sides of the blades communicate with each other through a plurality of pressure ports; the pressure difference allows a high-pressure fluid above the leeward sides of the blades to flow to a low-pressure fluid above the windward sides of the blades through a shorter path inside the pressure ports, to reduce friction,
   wherein the concave channels are recessed downward on surfaces of shells on windward sides of wings, so that fluid flows smoothly through the concave channels, and openings of the concave channels are flush with the surfaces of the shells on the windward sides of the wings.

2. The aircraft according to claim 1, wherein the concave channels are recessed downwards relative to shells of the blades on the windward sides, and the openings of the concave channels are flush with the shells of the blades and become larger gradually towards bottom surfaces to be big-end-down to allow fluid to flow through smoothly.

3. The aircraft according to claim 1, wherein the first plurality of open channels are formed in rear halves of ends, away from the fuselage, of the windward sides of the blades in the lengthwise direction, so that a pressure difference is generated due to different flow speeds of the rear halves and front halves of the blades.

4. The aircraft according to claim 1, wherein the aircraft is a propeller-driven airplane, and the first plurality of open channels are formed in the windward sides or leeward sides of the blades.

5. The aircraft according to claim 1, wherein the convex channels slightly protrude out of the surfaces of the shells.

6. The aircraft according to claim 1, wherein at least one of the concave channels and the convex channels are arc channels to extend paths through which more fluid pass.

7. The aircraft according to claim 1, wherein a pressure direction of a centrifugal force generated during rotation of the blades is consistent with a flowing direction of fluid in the first plurality of open channels, so that at least part of fluid flowing over the windward sides of the blades smoothly flows through the concave channels to generate a high-speed fluid.

8. The aircraft according to claim 1, wherein the pressure ports are formed between the windward sides and leeward sides of the blades, and the highness of the pressure ports is equal to the thickness of the shells of the blades; a pressure difference is generated around the blades due to different flow speeds between a high-pressure fluid above the leeward sides of the blades and a low-pressure fluid above the windward sides of the blades, and the pressure difference generates friction inside the pressure ports when the high-pressure fluid above the leeward sides of at least part of or even most of the blades flows to the low-pressure fluid above the windward sides of the blades.

9. The aircraft according to claim 8, wherein the fluid pressure surrounds the shells of the blades while passing through the generated friction on a large area, the fluid pressure smoothly passes through a small area inside the pressure ports under the action of power generated by the pressure difference, and the friction is reduced and the thrust is increased by reducing the area through which the fluid pressure passes.

10. An aircraft comprising a fuselage, wings and a propeller including a plurality of blades, wherein
a first plurality of open channels used to extend fluid paths are formed in windward sides of the blades in a lengthwise direction;
the first plurality of open channels extend from sides of roots of the blades to tails away from the sides of the roots, and the first plurality of open channels are concave channels and convex channel, or the first plurality of open channels are concave channels or convex channels; a pressure direction of a centrifugal force generated during rotation of the blades is consistent with a flowing direction of fluid in the first plurality of open channels, so that a larger pressure difference and lift are generated due to different flow speeds of a high-speed fluid flowing over the windward sides of the blades in the lengthwise direction and a low-speed fluid flowing over leeward sides of the blades in a widthwise direction;
the windward sides and leeward sides of the blades communicate with each other through a plurality of pressure ports; the pressure difference allows a high-pressure fluid above the leeward sides of the blades to flow to a low-pressure fluid above the windward sides of the blades through a shorter path inside the pressure ports, to reduce friction,
wherein the aircraft further comprises spoilers arranged in the concave channels or uniformly arrayed to form the convex channels, and the spoilers are in a shape selected from one or more of a triangular shape, a circular shape, a rhombic shape, a trapezoid shape, an oval shape, a spiral shape and an arc shape.

11. The aircraft according to claim 10, wherein the convex channels slightly protrude out of the surfaces of the shells, the concave channels are spiral channels to extend more paths through which fluid pass.

12. An aircraft, being a propeller-driven helicopter or airplane and comprising a fuselage and a propeller including a plurality of blades, wherein
first plurality of open channels used to extend fluid paths are formed in windward sides of the blades in a lengthwise direction;
the first plurality of open channels extend from sides of roots of the blades to tails away from the sides of the roots, and the first plurality of open channels are concave channels and/or convex channel; a pressure direction of a centrifugal force generated during rotation of the blades is consistent with a flowing direction of fluid in the first plurality of open channels, so that a larger pressure difference and lift are generated due to different flow speeds of a high-speed fluid flowing over the windward sides of the blades in the lengthwise direction and a low-speed fluid flowing over leeward sides of the blades in a widthwise direction;
the windward sides and leeward sides of the blades communicate with each other through a plurality of pressure ports; the pressure difference allows a high-pressure fluid above the leeward sides of the blades to flow to a low-pressure fluid above the windward sides of the blades through a shorter path inside the pressure ports, to reduce friction,
wherein the aircraft further comprises a second plurality of open channels which are formed in a windward side of the fuselage and used to extend a fluid path; the second plurality of open channels are concave channels or convex channels, or the second plurality of open channels are concave channels and convex channels.

13. The aircraft according to claim 12, wherein the second plurality of open channels cause a flow speed of fluid flowing over the windward side of the fuselage at the front part being different from a flow speed of fluid flowing over a leeward side of the fuselage at the rear part, and therefore a pressure difference-based thrust in a direction identical with a moving direction is generated from the rear part of the fuselage to front.

14. The aircraft according to claim 12, wherein fluid surrounding a fuselage negative-pressure zone flows around the fuselage at different speeds while reaching the rear part of the fuselage at the same time in order to maintain sealing of the fuselage negative-pressure zone, a pressure difference-based thrust in a direction identical with a moving direction is generated from the rear part of the fuselage to front due to different flow speeds of fluid in the second plurality of open channels in the windward side of the fuselage at the front part and fluid in the leeward side of the fuselage at the rear part.

15. The aircraft according to claim 12, further comprising spoilers arranged in the concave channels or uniformly arrayed to form the convex channels, and the spoilers are in a shape selected from one or more of a triangular shape, a circular shape, a rhombic shape, a trapezoid shape, an oval shape, a spiral shape and an arc shape.

16. The aircraft according to claim 15, wherein the second plurality of open channels are spiral to extend a fluid path on a windward side of the fuselage, and a pressure difference is generated due to different flow speeds of fluid in the second plurality of open channels in the windward side of the fuselage and fluid at the rear part of the fuselage.

* * * * *